Dec. 6, 1927.
W. F. REYNOLDS
1,651,546
FIXTURE FOR ADJUSTING CONNECTING RODS
Filed May 27, 1925    2 Sheets-Sheet 1
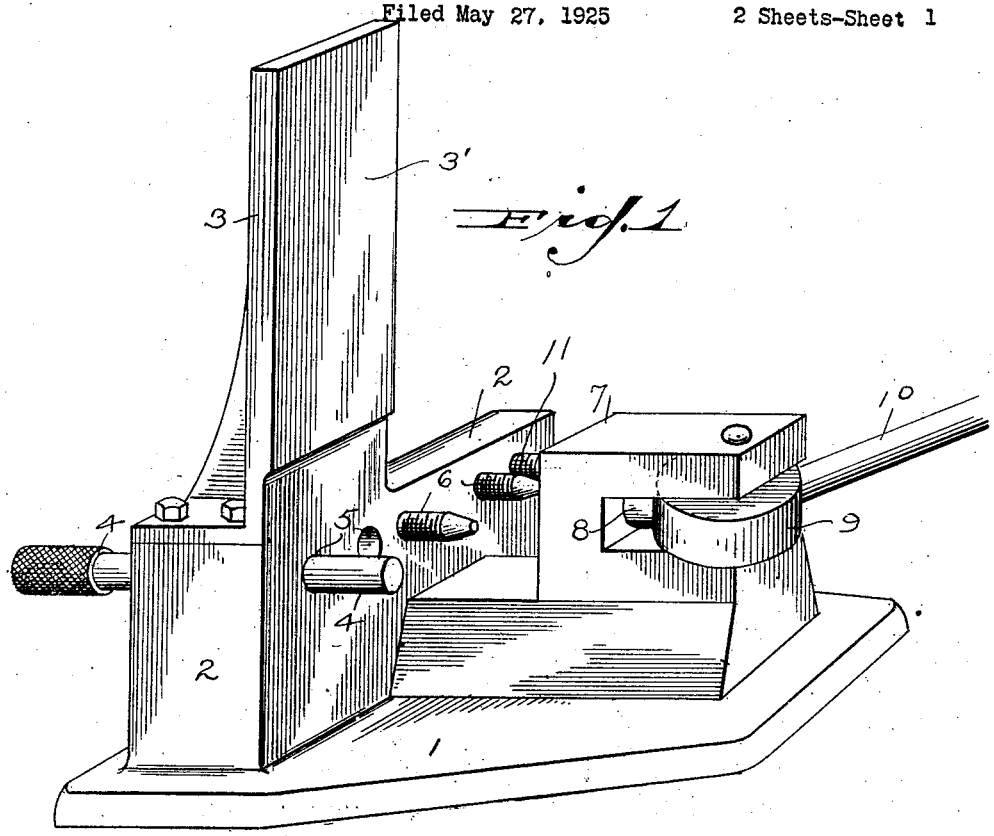
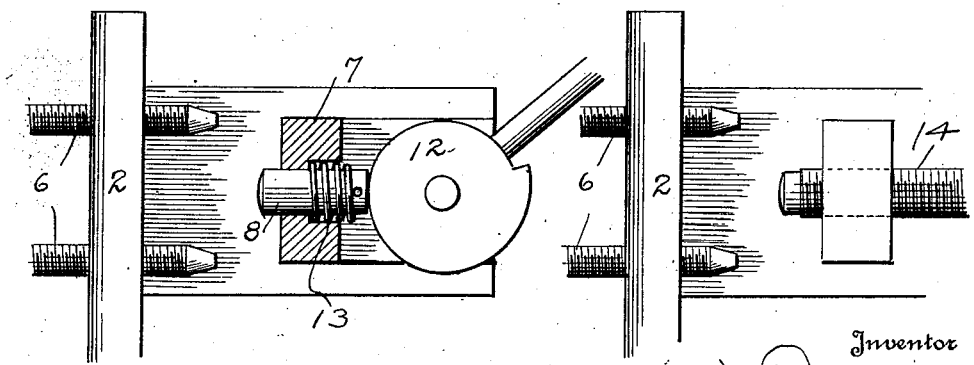

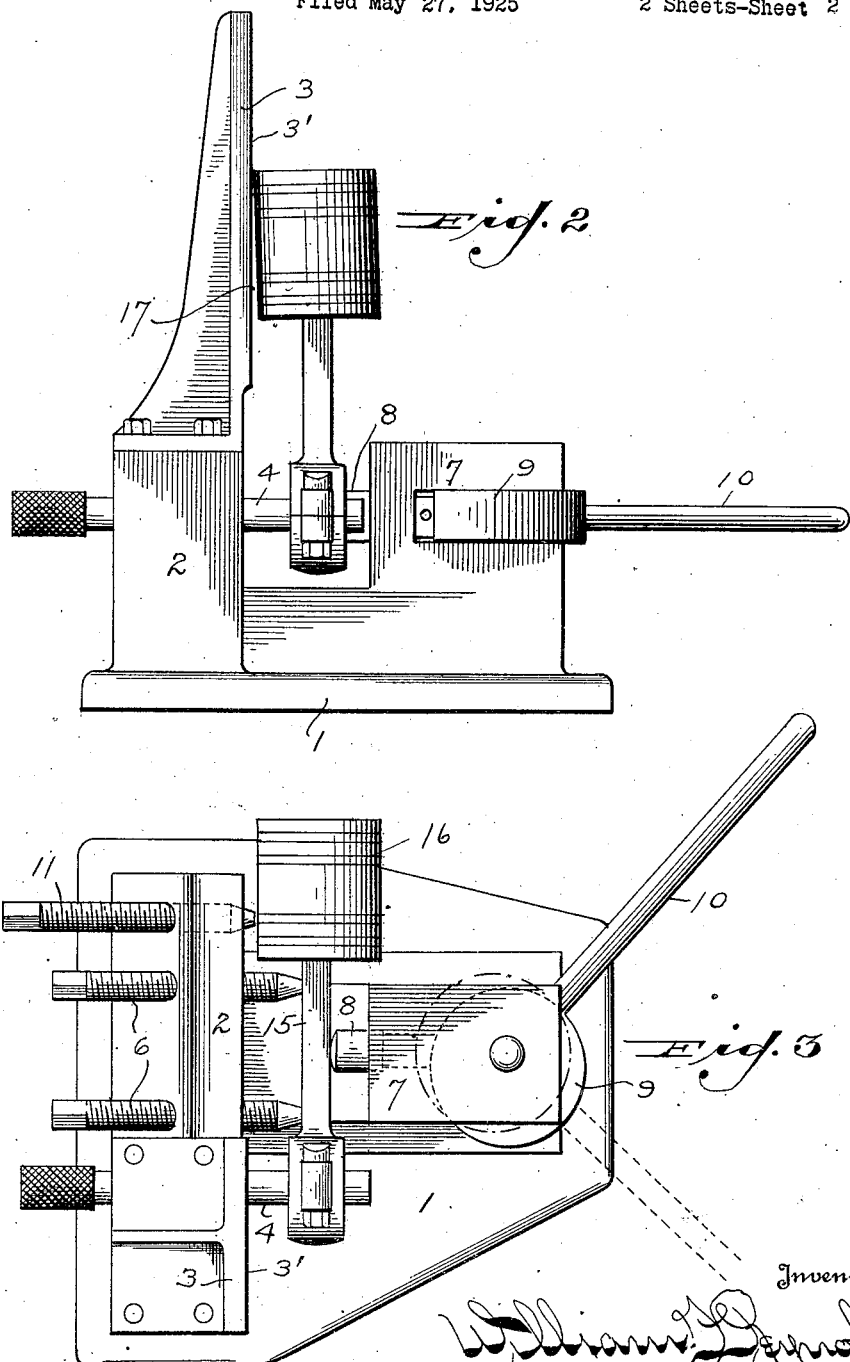

Patented Dec. 6, 1927.

1,651,546

UNITED STATES PATENT OFFICE.

WILLIAM F. REYNOLDS, OF DAYTON, OHIO.

FIXTURE FOR ADJUSTING CONNECTING RODS.

Application filed May 27, 1925. Serial No. 33,316.

My invention relates to gaging and bending fixtures for correcting and adjusting the angular relation of the piston head relative to the axis of the crank shaft bearing of a piston connecting rod. A difficulty frequently encountered by automobile repairmen is that of unalinement of the connecting rod bearings due to the connecting rod being bent laterally or to the fact that the crank shaft bearing has been "scraped in" out of true relation with the lineal extent of the connecting rod, or error in replacement of the wrist pins. Such irregularity in the "scraped in" crank shaft bearing or improperly alined wrist pin, induces an inclined position of the piston head, out of a true perpendicular relation to the axis of the crank shaft. Such lack of proper alignment results in undue friction and wear and unless corrected will result in permanent injury to the cylinder walls, the piston head and crank shaft bearing.

In the present invention there is contemplated a combined gaging and bending fixture including a vertically disposed flat test plate, in proximity to which is a longitudinally movable stud or plug projecting in accurately perpendicular relation with the plane of the surface plate or test plate and upon which the crank shaft bearing of the connecting rod is to be journalled with the piston head extending in proximate relation with the surface plate. If the axis of the crank shaft bearing and that of the piston head are in proper perpendicular relation to each other, the piston head and surface plate will exactly align with each other. However, any slight deviation of the axis of the crank shaft bearing from a proper perpendicular relation with the piston head will be amplified and exaggerated, and such irregularity will be at once apparent from the angular or inclined relation of the piston head with the plane of the surface plate. To correct such irregularities, there is provided in radial relation with the mounting stud or plug, a pair of abutment screws or studs into alignment with which the connecting rod is turned about its mounting upon the test stud or plug. A pressure plunger engages the connecting rod in opposition to such abutment screws or studs, at a point substantially mid-way therebetween and is operated by suitable actuating means, preferably a cam or eccentric having a limited throw, by which sufficient pressure is applied to bend or kink the connecting rod to return the piston head to proper perpendicular relation with the axis of the crank shaft bearing of the connecting rod. While screw pressure may be used for deflecting or bending the connecting rod, the limited throw cam or eccentric is employed to confine the bending operation to small degree, thus giving the operator more positive control. In order to accommodate pistons and connecting rods of different sizes, provision is made for spacing the abutment screws or studs different distances apart and for locating the trunnion stud or plug in differently spaced relation therewith.

The object of the present invention is to provide a corrective appliance by which distorted or bent connecting rods may be readily and quickly restored to proper alignment by the ordinary automobile mechanic, without the necessity of elaborate and expensive equipment and without the necessity of reboring or rebabbitting the bearings of the connecting rod.

A further object of the invention is to provide a simple convenient and comparatively cheap means for testing the relation of the piston head with the axis of the crank shaft bearing to determine the degree of deviation which may have resulted from an improperly placed wrist pin, or from having provided a crank shaft bearing which is slightly askew relative to the piston head, and for adjusting the piston head into proper perpendicular relation with the axis of such crank shaft bearing.

A further object of the invention is to provide a simple, cheap and economical device for straightening or adjusting connecting rods and other like elements, which will not only be cheapened in construction, but will be more efficient in use, permitting quick operation and unlikely to get out of repair.

A further object of the invention is to provide means by which the connecting rod bearing may be correctly aligned with extreme accuracy, and by minimum effort upon the part of the operator.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein is shown the preferred, but obviously, not necessarily the only form of embodiment of the invention, Fig. 1 is a perspective view of the piston testing and adjusting fixture forming the subject matter hereof. Fig. 2 is a side elevation thereof, showing a piston positioned thereon, for testing the relation of the piston head with the axis of the crank shaft bearing. Fig. 3 is a top plan view of the testing and adjusting fixture showing the piston, turned to recumbent position, and engaged for straightening or bending in order to bring the piston head into perpendicular relation with the axis of the crank shaft bearing. Fig. 4 is a detail plan view showing the use of an involute cam for actuating the pressure plunger in lieu of the eccentric illustrated in Fig. 3. Fig. 5 is a similar view illustrating the employment of screw pressure in lieu of cam pressure.

Like parts are indicated by similar characters of reference throughout the several views.

In constructing the testing and adjusting fixture forming the subject matter hereof, there is employed a base or bed plate 1, having arising therefrom an abutment head 2. Secured adjacent to one end of the abutment head 2, and projecting vertically therefrom is a surface plate 3, affording a test surface, which is reduced by machining and preferably by scraping to a perfectly plain surface 3', to serve as a gauge surface for testing the alignment of the piston head. Projecting loosely through the abutment head 2 in spaced relation below the surface test plate 3, is a reciprocatory plug or trunnion stud 4, which extends accurately in perpendicular relation to the plane of the test surface 3'. In the testing operation, the plug or trunnion stud 4 is employed in lieu of the crank shaft. The trunnion stud or plug 4, may be of a size corresponding with the diameter of the crank shaft and thus exactly fits the crank shaft bearing of the connecting rod to be mounted thereon. However, for universality of application, the plug or trunnion stud 4 is made somewhat smaller in diameter than the usual crank shaft and suitable bushings or bearing sleeves are employed in conjunction therewith to adapt it to the different sizes of crank shaft bearings as found in different connecting rods. Also to adapt the device to connecting rods of different length, two or more holes 5 are provided in the abutment head 2, in either of which the plug or trunnion stud 4 is insertable. Projecting through the abutment head 2 in positions aligned with the stud or plug 4 is a plurality of adjustable screw studs 6, against which the connecting rod is abutted when subjected to bending pressure. The abutment studs 6 of which three are shown, are spaced from each other, and from the plug or trunnion stud 4. Mounted in a suitable head 7 upon the base 1 is a reciprocatory plunger 8, adapted to engage the connecting rod on the side opposite the engagement of the abutment studs 6 and in a position substantially mid-way therebetween. The plunger 8 is preferably spring retracted and is actuated toward the abutment head 2 and against the connecting rod interposed between such plunger and the studs 6, by the oscillation of the cam 9, pivoted in the head 7. The cam actuator 9 is preferably an eccentric having a very limited throw. That is to say, the eccentric is pivoted but slightly off center. This eccentric head 9 bears against the rear end of the plunger 8 and is oscillated by the hand lever 10 to project the plunger against the connecting rod. The purpose in making the eccentric of limited throw is to positively limit the bending strain to which the connecting rod may be subjected. By bending the connecting rod successively throughout a small degree of deflection, the necessary adjustment may be much more accurately effected, than if the connecting rod is subjected to a radical deflection at a single operation, which may bend the connecting rod beyond the required point. If after the initial bending operation it is found that the connecting rod is not sufficiently straightened or deflected, the abutment screws 6 may be adjusted in the head 2, and the operation repeated. For ordinary conditions, the abutment screw studs 6 spaced equally on opposite sides of the plunger 8 are employed. However, for unusual conditions or extremely long connecting rods, it may be necessary to retract one of the screw studs 6 and employ in lieu thereof a similar stud 11, located a greater distance from the point of application of the bending pressure. Likewise one of the remaining screw studs 6 may be removed from its normal or usual location and relocated in the hole 5, by means of an adapter bushing. Thus the distance between the abutment studs may be increased or diminished to vary the extent of application of the bending strain.

In lieu of the eccentric head 9 for operating the plunger 8, which head automatically relieves the pressure as it passes a dead center position, there may be employed an involute cam head as shown at 12 in Fig. 4. By use of the involute cam head the pressure upon the reciprocatory plunger 8 is progressively increased in proportion to the degree of oscillation of the operating lever 10. In either construction the spring 13 serves to retract the plunger 8 as the oscillatory actuating head is returned to its initial position. In Fig. 5 there is shown a pressure screw 14, substituted for the oscillatory cam head, and the reciprocatory plunger. By adjusting the pressure screw 14 the necessary bending pressure is applied directly to the connecting rod which bears against the screw studs 6.

In using the device the crank shaft bearing of the connecting rod to be tested is engaged over the plug or trunnion stud 4. This engagement may be directly with the plug or trunnion stud in the event the latter is of the same diameter as the crank shaft pertaining to the particular bearing, and so fits the bearing. Otherwise the crank shaft bearing of the connecting rod 15 shown in Figs. 2 and 3 will be centered upon the plug or trunnion stud 4 by use of an adapter bushing of suitable size. The connecting rod thus mounted upon the stud is turned upward into proximate relation with the surface plate 3. If the crank shaft bearing is in proper axial relation with the piston head 16, the side of the piston head will assume an exactly parallel relation with the test surface 3'. If, however, the piston head and axis of the crank shaft bearing are not in proper perpendicular relation with each other, this will be indicated by an angular diversion as at 17, between the test surface 3' and the side of the piston head 15. The operator determining in which direction the connecting rod must be bent in order to bring the piston head 16 and the test surface 3' into accurate parallel relation, oscillates the piston and connecting rod downwardly about their pivotal connection upon the plug or trunnion stud 4 to the recumbent position shown in Fig. 3. This is the correction position. That is to say, the piston operated upon is turned to different radial positions about the plug or trunnion stud 4, one of which is the test position in which the side of the piston 16 is compared with the test surface 3', and in the other of which radial position the connecting rod is subjected to bending pressure to insure parallel relation of the piston head with the test surface when returned thereto by reverse movement. In the recumbent bending position the connecting rod 15 is engaged on one side by the screw studs 6, which serve as spaced abutments. On the opposite side the connecting rod 15 is engaged at a point substantially mid-way between the studs 6 by the reciprocatory plunger 8. Upon oscillation of the lever 10 and actuating head 9, the plunger 8 is projected against the connecting rod with sufficient pressure to bend it slightly. To prevent straining or marring the end of the connecting rod, the plug or trunnion stud 4 is preferably withdrawn from the connecting rod during the bending operation. When the connecting rod has been bent by the actuation of the pressure plunger 8, the plug or stud 4 is restored to its engagement in the crank shaft bearing of the connecting rod and the piston is again returned to its upright position as shown in Fig. 3 for comparison with the test surface 3'. If the side of the piston head is found to extend in exact parallel relation with the test surface, the necessary adjustment is completed. However, if it is found that there still remains some angularity or divergence of the piston head and test surface, the piston is again returned to its recumbent bending position, shown in Fig. 3, for further correction.

The studs 6 are adjusted to compensate for the previous deflection and pressure is again applied until the piston head is brought into the required parallel relation with the head surface 3'. If an extremely long connecting rod is to be operated upon, the trunnion stud or plug 4 is transferred to the outermost hole 5 in the abutment head 2, and one of the screw studs 6 is transferred to the inner hole 5 in which it is engaged by use of a suitable bushing. The other screw stud 6 may be withdrawn and the stud 11 employed in lieu thereof, thus subjecting the connecting rod to a longer range of bending pressure. Obviously, in the use of the involute cam or the pressure screw shown in Figs. 4 and 5, the operation and various steps of the method of correcting the connecting rod are the same as those heretofore described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In an adjusting fixture for pistons, a base plate, an abutment head fixedly disposed thereon, screw studs extending through the abutment head in spaced relation with each other, a reciprocatory mounting stud also extending through the abutment head in a position alined with the screw studs, a test plate mounted with its surface in a plane perpendicular to the axis of the mounting stud for comparison with the side of the head of the piston being adjusted, a reciprocatory plunger located intermediate the screw studs, and in opposing relation thereto, a mounting for said plunger upon said base plate, and a cam actuator for said plunger by which the plunger is thrust against a piston rod resting against the screw studs to subject the rod to bending strain, the degree of bend being determined by adjustment of the screw studs and ascertained by comparison of the piston head with the test plate while the piston rod is engaged upon said mounting stud.

2. In an adjusting fixture for pistons, a main support adapted to receive a piston rod with the piston head attached thereto, a pair of spaced screw threaded studs carried thereby, a pressure member located in opposing relation substantially midway between said screw threaded studs, means for giving to the pressure member a limited degree of movement to subject a piston rod resting upon the screw studs a limited bending strain, the strain to which the piston rod is subjected being regulated by the adjustment of the screw studs, and gage means with which to compare the side of the piston head to ascertain the required degree of deflection of the rod.

3. In an adjusting fixture for piston rods, a test plate having a plane surface, a mounting stud extending in perpendicular relation with the plane surface of said plate, and adapted to receive the crank shaft bearing of a piston rod, with said rod overhanging the test plate, and a plurality of spaced adjustable abutment members disposed in radial relation with the mounting stud, into alignment with which the piston rod is adjustable by oscillatory movement about the mounting stud, and a pressure member having a predetermined degree of movement engaging the piston rod at a point intermediate the spaced abutments to subject the piston rod to bending strain, the degree of bend being determined by the adjustment of the spaced abutment members.

4. In an adjusting fixture for pistons, a mounting stud for engagement with the crank shaft bearing, of a piston rod, a surface plate with which to compare the alinement of the piston head and a bending mechanism arranged and shaped to accommodate a piston rod and attached piston head arranged in different radial positions relative to the mounting stud about which a piston rod is capable of swinging movement from overhanging relation of the piston head with the test plate into position to be operatively engaged by the bending mechanism and vice versa.

5. In an adjusting fixture for pistons, the combination with a surface test plate with which to compare the alinement of the piston head and a mounting stud to engage the crank shaft bearing of the piston rod and projecting in perpendicular relation with the surface of the test plate, of a bending mechanism contiguous to said test plate capable of receiving the piston rod with the piston head attached thereto and subjecting the piston rod to bending strain, the degree of which is determined by comparison of the piston head with the test surface.

6. In an adjusting fixture for pistons, a surface test plate with which to compare the alinement of the head of the piston, a rod bending mechanism shaped and disposed to receive a piston rod with an attached piston head and a mounting stud for engagement with the crank shaft bearing of the piston rod located in a position common to both the test surface and the bending mechanism and about which the piston rod is swingingly adjustable to present the piston head in operative relation with the test surface and the rod in operative relation with the bending mechanism.

In testimony whereof, I have hereunto set my hand this 20 day of May, A. D. 1925.

WILLIAM F. REYNOLDS.